March 7, 1967 J. P. JONES, JR 3,308,236

BINARY CODING-DECODING CIRCUITS

Original Filed May 22, 1963 2 Sheets-Sheet 1

INVENTOR
JOHN PAUL JONES, JR.

BY
WATSON, COLE, GRINDLE and WATSON
ATTORNEYS

INVENTOR
JOHN PAUL JONES, JR.

BY
WATSON, COLE, GRINDLE and WATSON
ATTORNEYS

United States Patent Office 3,308,236
Patented Mar. 7, 1967

3,308,236
BINARY CODING-DECODING CIRCUITS
John Paul Jones, Jr., Wynnewood, Pa., assignor to Navigation Computer Corporation, a corporation of Pennsylvania
Original application May 22, 1963, Ser. No. 282,342, now Patent No. 3,249,199, dated May 3, 1966. Divided and this application Oct. 5, 1965, Ser. No. 493,158
8 Claims. (Cl. 178—75)

This application is a division of copending application, Serial No. 282,342 for Electronic Keyboard Control System, filed May 22, 1963, now Patent No. 3,249,199.

This invention relates to electronic data processing circuits, and more particularly, it relates to circuits for coding and decoding binary signals representing numeric or alphameric characters.

In data processing equipment, which is used for transmission and reception of coded electronic signals, it has been customary to use separate coding circuits for the two different modes of operation, thus requiring substantial duplication of circuits operating in similar fashion.

Accordingly, it is an object of this invention to provide improved and simplified coding-decoding circuits for two-way use both in transmission and reception of on-off binary electronic signals representing data characters.

Thus, in accordance with the invention, a coding-decoding network comprising a matrix of interconnected diodes is constructed for two-way operation for both transmission and reception of binary coded data. In essence, the coding diodes are operated as decoding AND gates during reception of data and as encoding OR gates during transmission of data so that the diodes serve a dual purpose without changing their circuit configuration.

The invention is described in detail in a typical system environment in the following specification setting forth various features and advantages of the invention with reference to the accompanying drawing, in which.

Figure 1:
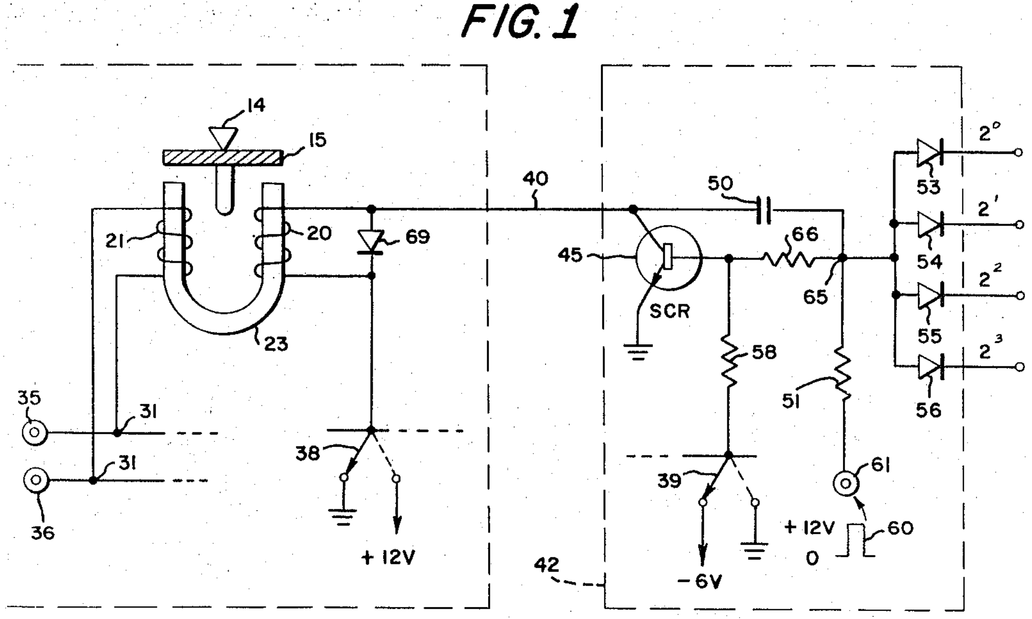
FIGURE 1 is a schematic circuit diagram of a typewriter control circuit embodying the invention.

FIGURE 1 is a diagram of a control circuit used in an overlay adapter for a typewriter keyboard which both transmits information to external electronic equipment as the typewriter is used and receives control signals from external electronic equipment which operate the typewriter keyboard. This system is described and claimed in the above identified copending application. Accordingly, the prior patent application is incorporated herein by reference in order that the description in this application may be confined to the features pertinent to its operation and understanding, and the nature of the invention need not be obscured by the peripheral elements of the system embodying the present invention.

Figure 2:
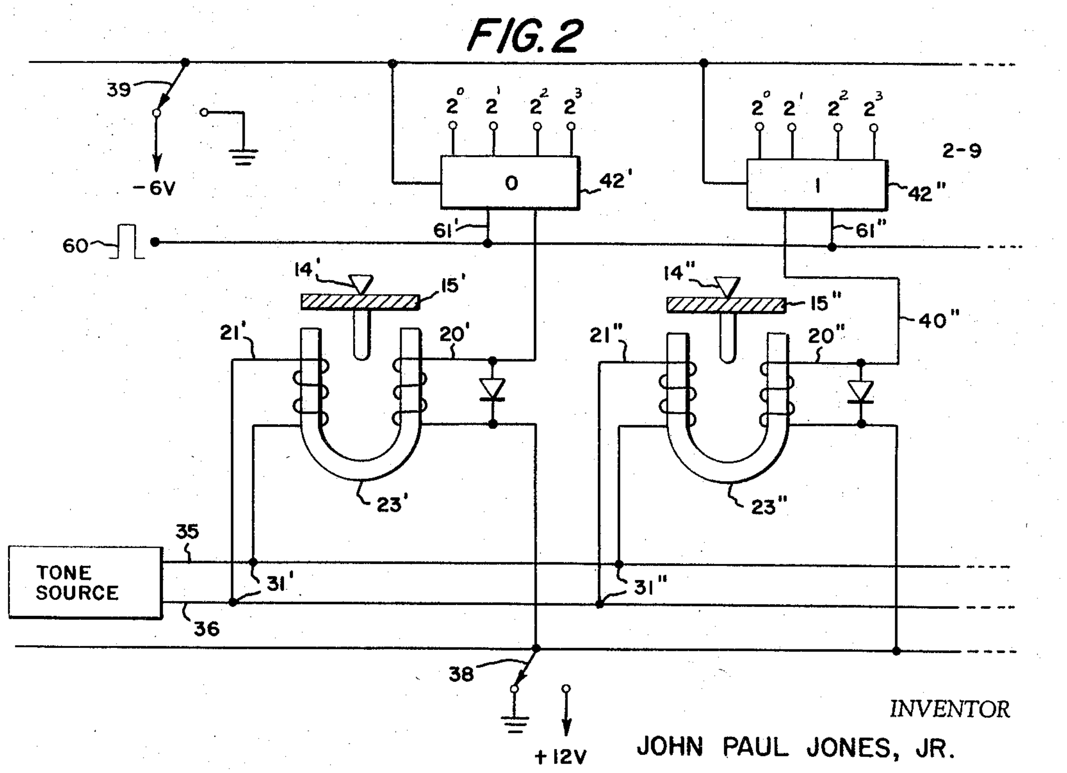
FIGURE 2 is a system circuit diagram, partly in block, including the typewriter control circuits.

Each typewriter key is schematically shown at 14 and has a circuit similar to that of FIGURE 1, in which the magnetic member 15 closes upon magnetic cup core 23 to increase inductive coupling between windings 20, 21 as the typewriter keys are operated in the transmit mode of operation as specified by the shown position of ganged mode control switches 38 and 39. In the other mode of operation attained by moving the switches into their dotted position, the cup core 23 acts as a solenoid to attract member 15 and close the typewriter key responsive to decoded signals received from an external electronic system on a single wire lead 40. System intercouplings of the multiplicity of key circuits are illustrated in FIGURE 2 which for example, may comprise a numeric data processing system providing for operation with decimal characters 0–9 at the keyboard and communicating with external data processing equipment in binary-coded decimal form by way of the diode network 53, 54, 55, 56 of encoding-decoding circuits 42 embodying the present invention and discussed in detail hereinafter by reference to the coding matrix circuit configuration of FIGURE 3.

In the transmit or readout mode of operation tone signals appear at terminals 35 and 36. With switch arm 38 grounded, windings 20 serve as secondary windings for coupling the tone signals to lead 40 with enough amplitude to constitute a signal whenever key 14 is closed to increase the inductive coupling between the windings. Switch arm 39 cuts off the silicon controlled rectifier (SCR) 45 so that it is not part of the circuit in this mode of operation. Capacitor 50 and resistor 51 with diodes 53–56 serve as the output circuit to encode or fan out the tone signals to the various busses connected to identify the particular key by a binary code. In the case shown four lines are energized by a modulated tone pulse when the key 14 is depressed. Thus, the diodes serve as a mixer commonly called an OR gate during transmit mode while only requiring a single line 40 between the pushbutton 14 at the keyboard and the control logic in the circuitry box 42.

In the receiving or typewriter printing mode of operation, plus 12 volts is coupled to winding 20 so that silicon control rectifier 45 can energize the solenoid and close the key 14. Silicon control rectifier is put into circuit by grounding the base through resistor 58 via switch arm 39. The plus 12 volt pulse 60 appearing at terminal 61 strobes the input diode gates 53–56, when the input busses are all in the positive potential AND gate position permitting resistor 51 to go positive designating coded selection of this particular key circuit. If all input diodes are held at plus 12 volts, point 65 need only go slightly positive to drive silicon controlled rectifier 45 into conduction through series input resistor 66 and thus draw solenoid cap 15 closed by current through winding. The input pulse 60 has a duration of the proper length for actuating the typewriter keys. Input signals may be produced from magnetic or punch paper tape readers or the like for automatic control of the typewriter.

After the strobe pulse ends, the amplifier goes into non-conduction by action of capacitor 50 and resistor 51. Diode 69 serves to damp the overshoot voltage in coil 20. All the AND gate diodes must be held closed for the duration of the strobe pulse period if the strobe pulse period is used to determine the length of key-down duration on the typewriter.

Figure 3:
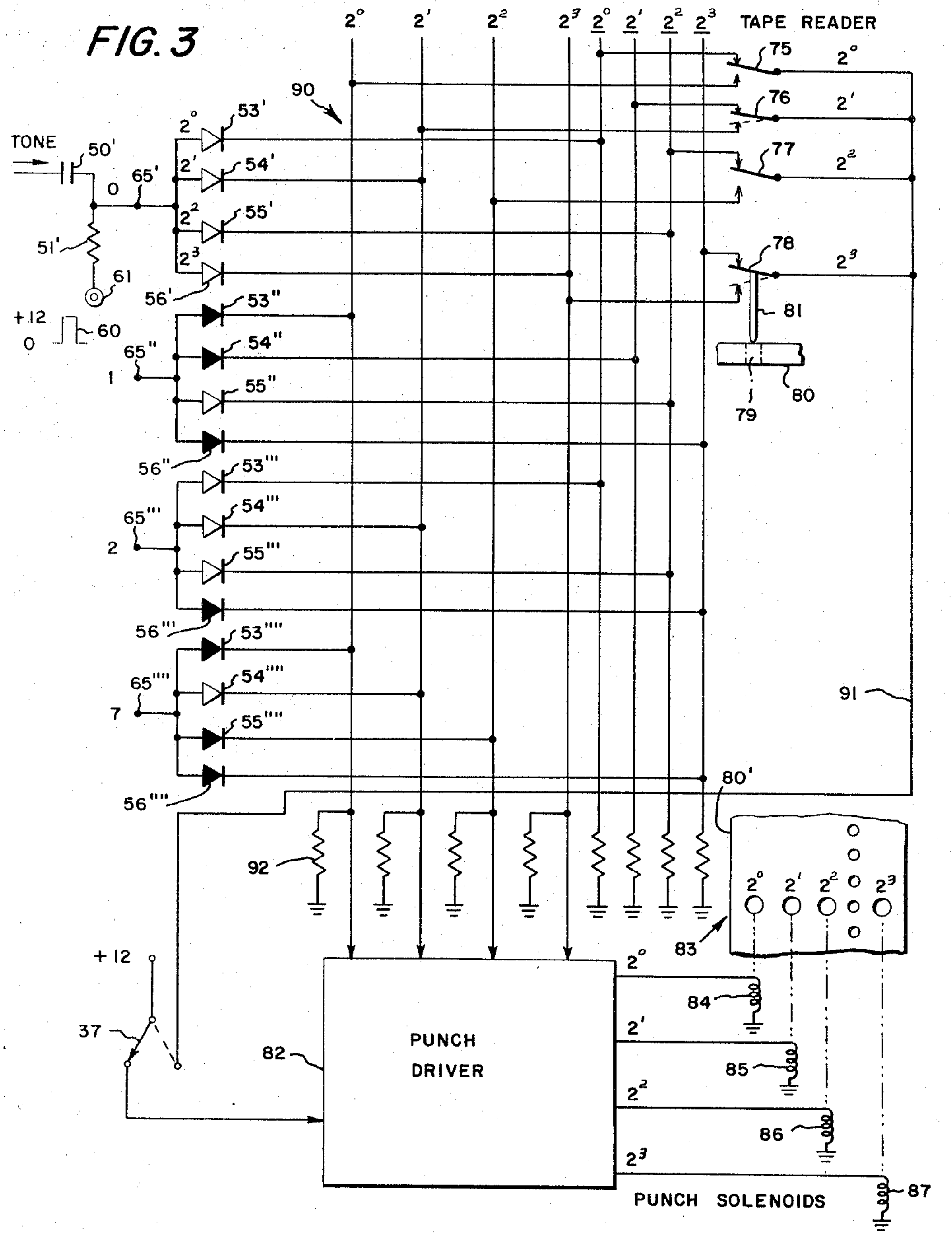
FIGURE 3 is a schematic diagram of a two-way coding-decoding network embodiment of the invention.

A typical external electronic system with which the encoding-decoding circuits of this invention may be used is a punch-paper tape punch-reader combination serving to provide receive mode signals from the reader and to utilize transmit mode signals at the punch. Operation of the invention with such a system is illustrated by FIGURE 3 which refers to the circuits of FIGURES 1 and 2 by use of corresponding reference characters.

In this diagram the tape reader is shown in part by sensing switches 75–78 at the binary levels $2^0$, $2^1$, $2^2$, and $2^3$, thereby serving to illustrate operation for a numeric binary-coded-decimal system, which can be expanded in similar manner for alphameric or other coding configurations. Typically, each switch has a C type contact which rests in its two respective positions depending upon whether a hole 79 is sensed in paper tape 80 by a switch arm 81 attached to each switch. The entire reader configuration is conventional and may take the form of that described in my copending application, Serial No. 447,381, filed April 12, 1965, for Asynchronous Paper Tape Reader, for example.

Similarly, the punch is shown in schematic partial form to indicate a signal responsive driver 82 which operates a plurality of punches (not shown) for punching paper tape holes 83 by means of solenoids 84–87 associated with the respective binary columns $2^0$, $2^1$, $2^2$, and $2^3$ in the paper tape 80[1]. This punch may take the form of that in my U.S. Patent 3,178,106 issued April 13, 1965, for example.

For illustrating operation of a typical diode matrix constructed to use diodes 53, 54, 55, and 56 as two-way AND-OR gates in accordance with this invention to thereby use a single matrix interconnection 90 for both encoding and decoding, representative connections for decimal characters 0, 1, 2, and 7 are shown in decimal-coded-binary notation. This is accomplished without changing any diode connections and uses the same diodes for both the punch and reader. Switch 37, which may be ganged with switches 38 and 39 is used to provide plus 12 reading voltage on line 91 for the reading switches 75–78 when operating in receive mode, and for energizing the punch driver 82 and thus permitting operation of punches from solenoids 84–87 when operating in transmit mode.

Each numerical character line 65 is uniquely identified for punching by binary coded decimal notation by diodes 53–56. Thus, the decimal zero line is encoded as "10" by diodes 54′ and 56′ with weights of $2'=2$ and $2^3=8$ respectively which weighted codes may be added together to provide a total of 10. Similarly, diodes 53″ in the decimal one line represents the weight of $2^0=1$, etc.

As may be seen, the eight columns of the wiring matrix are labeled for the respective weights $2^0$, $2^1$, $2^2$, and $2^3$ in positive or binary "1" form and $\overline{2^0}$, $\overline{2^1}$, $\overline{2^2}$, and $\overline{2^3}$ in negative or binary "0" form, so that in this system the binary "1" represents the presence of a hole in the tape and the presence of the corresponding weighted binary-coded-decimal binary bit, whereas binary "0" represents the absence of a hole, and is necessary only in the reading mode for preventing ambiguity. That is, the presence of the $2^1$ bit is present in either a decimal zero, two or seven, and thus the absence of the corresponding zero binary bits is necessary for decoding in the reading operation. However, only binary ones are necessary for punching so that columns $2^0$, $2^1$, $2^2$, and $2^3$ are common with the reader and the punch and the corresponding binary-one-coded diodes connected to these columns serve in the dual capacity as AND-OR gates.

Consider now the reading mode where a binary-coded decimal character zero is present in the tape 80 as sensed by depression of switches 76 and 78 to their lowermost contacts (shown in dotted lines). Then the four columns $2^0$, $2^1$, $2^2$, and $2^3$ will be at plus 12 volts to cause only that group of coding diodes 53′–56′ in decimal line zero represented at terminal 65′ to all be at plus 12 volts and cause the diodes to raise terminal 65 to plus 12 volts when the strobe pulse 60 is presented. However, decimal lines one, two, seven, etc. will be at ground potential by operation of resistors 92 connected in the column conductors respectively causing diodes 56″, 56‴, 56⁗, etc. to conduct and clamp the respective terminals 65″, 65‴, and 65⁗ to ground. For noting this condition the conducting diodes are darkened.

In the punching mode, however, the tone signal passes through capacitor 50′ and finds unstrobed ground potential at resistor 51′ to thereby cause the diodes to be fanned out OR gates carrying the tone signal into only column lines $2^0$, $2^1$, $2^2$, and $2^3$, since columns $\overline{2^0}$, $\overline{2^1}$, $\overline{2^2}$, and $\overline{2^3}$ are disconnected and open circuited by switch 37. Also, switch 37 disconnects the tape reader so that only the punch driver receives and decodes the signals which encode and identify the source line through diodes 53–56. Consider the decimal one line 65″, for example, where only diode 53″ is in circuit to encode the $2^0$ punch solenoid 84 to the exclusion of the others. Simliarly, decimal seven line 65⁗ will utilize diodes 53⁗, 54⁗, and 55⁗ to encode $2^0$, $2^1$, and $2^2$ punch solenoids 84, 85, and 86 for a weighted decimal sum of seven, etc.

It is clear from the foregoing embodiments of the invention therefore, that simplified and improved coding-decoding circuits have been afforded utilizing circuit components more efficiently in dual capacity, for which the following claims are submitted to define the nature and scope of the invention.

What is claimed is:

1. Apparatus operable with a solenoid having an actuating winding comprising in combination, a diode network coupled to a plurality of code terminals, an auxiliary winding on the solenoid loosely magnetically coupled to the solenoid actuation winding, means coupling a signal source to one of the windings, means coupling the diode network to the other of the windings and means manually operating the solenoid to improve magnetic coupling thereby to distribute the signal from the source to the code terminals through the diodes.

2. A circuit as defined in claim 1, wherein said means operating the solenoid is a manually depressable key and including external electronically actuated means having both a transmitting and receiving device, means operating the receiving device upon presentation of said signal source through said diodes to the receiving device at said code terminals, and means for magnetically operating said manually depressable key with said solenoid responsive to operation of the transmitting device to present a selected code at said code terminals.

3. A circuit as defined in claim 2 having a switching circuit for changing control at will from a transmitting mode of operation to a receiving mode to cause respectively a selected key to be operated by said selected electrical signal in the receiving mode and to cause the manual depression of the selected key to produce a unique electrical signal at the electronically actuated means in the receiving mode.

4. A circuit as defined in claim 2 wherein the diode network serves as an "OR" circuit in presenting the signal to said code terminals and serves as an "AND" circuit responsive to receipt of said external signals at the code terminals.

5. A two mode encoding network comprising in combination, a gating resistor, a set of diodes connected to said resistor in the same polarity, a source of binary coded D.-C. signals each connected with said resistor through one of said diodes, a selectively applied potential source of the same polarity as said signals coupled to said resistor to establish the conduction condition of the diodes thereby constituting mode of operation as an "AND" gate responsive to unique codes presented by said source of signals, a further source of signals available in the absence of said potential source to said resistor, an output device connected to selected ones of said diodes to thereby receive the signal in binary encoded form while operating in another mode as an "OR" gate, and means selectively establishing one mode of operation at a time by changing operating potentials without changing diode circuit connections.

6. A two-way diode gate comprising in combination, a gating resistor, means establishing one end of the resistor selectively at two different D.-C. potentials, a single line source of signals coupled to the other end of the resistor, utilization means for detecting a change of potential also connected at said other end of the resistor, a plurality of diodes coupled in the same polarity to said other end of the resistor, a source of binary coded signals coupled to said resistor through all of said diodes, and a utilization device for operation from binary coded signals coupled to the resistor through selected ones of said diodes.

7. A gate as defined in claim 6 including operating mode selection means operatively connecting the single line source of signals and said utilization device for operation from binary coded signals in one operation mode and operatively connecting the utilization means for detecting a change of potential, said source of binary signals and said means establishing the two different D.-C. potentials in the other mode.

8. An encoding circuit comprising a plurality of diodes connected permanently with a single set of load devices into a coding configuration arrayed between two sets of coded access terminals, means for changing polarities of potentials to said single set of load devices to thereby selectively change the operation of said coding configuration from "AND" to "OR" mode of diode operation, a communication path with a single line signal source coupled to binary coded utilization means to pass signals in one direction through said access terminal to said plurality of diodes operable conjointly with selection of a first one of said ploarities as an "OR" gate, and a further communication path with a binary coded signal source coupled to single line utilization means coupled conjointly with selection of a further one of said polarities to pass signals through said access terminals in the opposite direction through the same said diodes in operation as an "AND" gate.

References Cited by the Examiner

UNITED STATES PATENTS

| | | | |
|---|---|---|---|
| 2,688,739 | 9/1954 | Hofgaard | 178—17 |
| 2,959,775 | 11/1960 | Marcus | 340—176 |
| 3,200,192 | 8/1965 | Auwaerter et al. | 178—3 |

NEIL C. READ, *Primary Examiner.*

T. A. ROBINSON, *Assistant Examiner.*